United States Patent [19]

Goudy, Jr. et al.

[11] Patent Number: 4,711,370
[45] Date of Patent: Dec. 8, 1987

[54] SEAL MEMBER FOR PELLET DISPENSER

[75] Inventors: Paul R. Goudy, Jr.; William G. Weekley, both of Milwaukee, Wis.

[73] Assignee: Autotrol Corporation, Milwaukee, Wis.

[21] Appl. No.: 882,201

[22] Filed: Jul. 3, 1986

Related U.S. Application Data

[63] Continuation of Ser. No. 655,906, Sep. 28, 1984, abandoned.

[51] Int. Cl.$^4$ ............................................. B65G 59/06
[52] U.S. Cl. ................................... 221/265; 221/258; 222/370; 277/92; 384/517; 384/611
[58] Field of Search .................. 221/265, 263, 258, 9, 221/13, 15, 21; 277/42, 43, 92, 95; 222/290, 292, 328, 370, 367; 384/517, 611

[56] References Cited

U.S. PATENT DOCUMENTS

| | | | |
|---|---|---|---|
| 545,837 | 9/1895 | Baker | 222/370 |
| 2,178,001 | 10/1939 | Siehrs | 221/13 |
| 3,193,266 | 7/1965 | Becker | 263/32 |
| 3,326,559 | 6/1967 | Persons | 277/95 |
| 3,785,525 | 1/1974 | Handeland | 221/265 |
| 3,907,310 | 9/1975 | Dufour | 277/92 |
| 3,918,607 | 11/1975 | Rowlette | 221/15 |
| 3,991,908 | 11/1976 | Thomas | 221/154 |
| 3,994,420 | 11/1976 | Harper | 222/57 |
| 3,999,945 | 12/1976 | Kushner | 23/253 |
| 4,033,482 | 7/1977 | Kushner | 222/136 |
| 4,191,308 | 3/1980 | Allen et al. | 221/202 |
| 4,195,853 | 4/1980 | Otsuka | 277/92 |
| 4,235,849 | 11/1980 | Handeland | 222/370 X |
| 4,260,165 | 4/1981 | Hartelius | 277/92 |

FOREIGN PATENT DOCUMENTS

| | | | |
|---|---|---|---|
| 719968 | 10/1965 | Canada | 222/86 |
| 1039244 | 10/1953 | France | 222/367 |
| 301180 | 9/1932 | Italy | 222/370 |
| 858805 | 1/1961 | United Kingdom | 277/43 |

Primary Examiner—Joseph J. Rolla
Assistant Examiner—Edward S. Ammeen
Attorney, Agent, or Firm—Quarles & Brady

[57] ABSTRACT

A seal member for use in a pellet dispensing apparatus which can provide a barrier between a rotor member and a supply hopper so that gas emitted from the supply hopper will not escape. The seal arrangement also serves the function of a spacing or biasing member for a drive gear as well as a bearing surface. The seal member is disposed in a manner that it will selfadjust during wear yet is flexible to withstand contact with debris. Preferably the seal unit is fabricated from a fluorocarbon resin and is frusto conical in shape.

2 Claims, 4 Drawing Figures

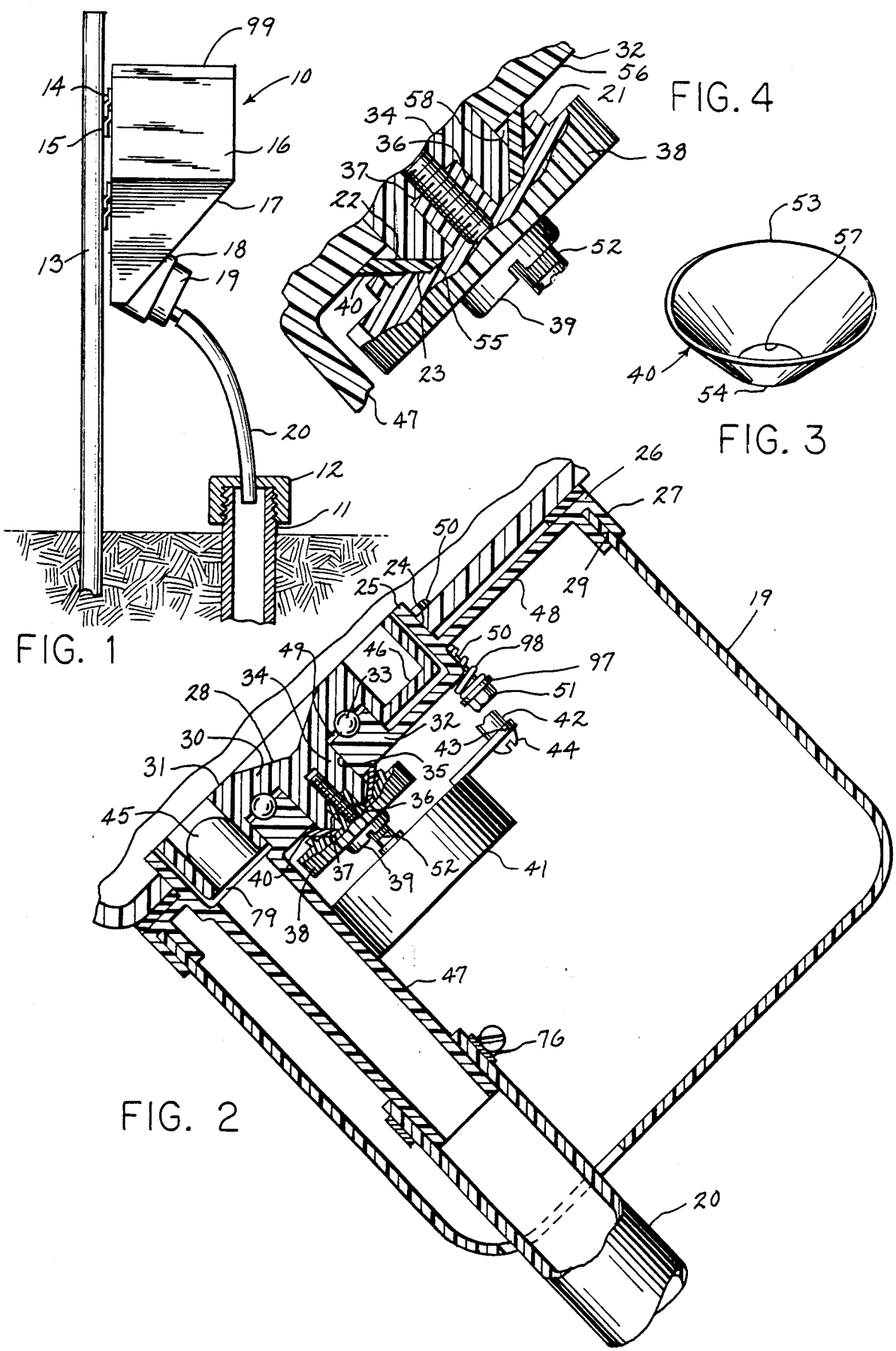

SEAL MEMBER FOR PELLET DISPENSER

This application is a continuation of application Ser. No. 655,906, filed 9/28/84, now abandoned.

BACKGROUND OF THE INVENTION

This invention relates to a seal member for use in a pellet dispensing apparatus. More particularly, it relates to a sealing component in a chlorine tablet dispensing apparatus which can provide a barrier for a rotor assembly so that chlorine gas will not escape from the hopper to which the rotor member is attached as well as provide a spacing member and bearing surface for a drive gear.

In the dispensing of pellets such as chlorine tablets from a hopper for the purpose of water treatment, a rotor mechanism is normally employed such as described in U.S. Pat. Nos. 3,785,525 and 4,235,849. A problem arises in utilizing a rotor mechanism for dispensing chlorine tablets in that the chlorine gas is corrosive to surrounding equipment as well as toxic to operating personnel. Accordingly, it is desirable to provide a closed hopper for the chlorine tablets. This presents a problem where a rotor member is utilized to dispense the tablets, as any openings between the rotor shaft and the rotor housing can be a potential source of leakage. Neither of the apparatus described in the previously mentioned U.S. Pat. Nos. 3,785,525 and 4,235,849 provide a solution to the problem. In U.S. Pat. No. 4,033,482 as well as U.S. Pat. No. 3,999,945 the use of a tapered, conically shaped rotor is described for metering purposes which is made from Teflon so as to conform in shape to the shape of the inside mating surface of the housing to minimize leakage. In U.S. Pat. No. 4,191,308, an annular seal (41) is utilized between a tablet container and a base and in conjunction with a tablet dispenser employing a rotor.

The seal device of this invention is particularly suited for use in the Bactericidal Pellet Dispenser which is disclosed in U.S. Pat. No. 4,662,538, issued May 5, 1987. The teachings of this patent application are incorporated herein by reference.

It is an advantage of the present invention to provide a seal member for a drive shaft in a pellet dispensing device wherein the pellets can be a source of toxic and corrosive gas. It is another advantage of this invention to provide a seal member for a rotating shaft in a pellet dispensing mechanism which can also serve as a biased spacing device between a drive gear and a bearing housing as well as a bearing surface for a drive gear. Still other advantages of this invention are a seal member in a pellet dispensing apparatus which is adapted to be fitted with loose parts; can resist the presence of debris and will automatically adapt to operating wear. Other advantages are a seal member having the foregoing advantages which can be manufactured from readily available materials and from existing equipment to thereby provide a seal of this type at low cost.

SUMMARY OF THE INVENTION

The foregoing advantages are accomplished and the shortcomings of the prior art are overcome by the present seal member for a rotor assembly wherein the rotor member has passages for the movement of particulent material therethrough. A housing provides a supporting surface and a shaft member is connected to the rotor member and extends through the housing. A drive gear is secured to the shaft member and a seal member is positioned between the gear and the housing. The seal member encompasses the area of the shaft extension from the housing and is constructed of a material and in a manner to provide both an enclosure of the area and a biasing of the gear away from the housing. Additionally, the seal is fabricated from a fluorocarbon material (Teflon) to provide a lubricating bearing surface. The seal member is easily manufactured from a sheet of the fluorocarbon resin material by cutting to the desired shape with a central aperture and shaping by cold forming in the preferred hollow frusto conical configuration.

BRIEF DESCRIPTION OF THE DRAWINGS

A better understanding of the present tablet dispensing device will be accomplished by reference to the drawings wherein:

FIG. 1 is a view in side elevation illustrating a pellet dispenser for use with the seal member of this invention and in conjunction with a well casing.

FIG. 2 is an enlarged view in vertical cross section illustrating the seal member in the pellet dispenser indicated in FIG. 1.

FIG. 3 is a top perspective view illustrating the seal member.

FIG. 4 is an enlarged view in vertical section showing the seal member mounted in the pellet dispenser and in conjunction with a driving gear.

DESCRIPTION OF THE EMBODIMENTS OF THE INVENTION

Proceeding to a detailed description of the embodiment of the present invention and particularly to FIG. 1 a pellet dispenser generally 10 is shown which will utilize the seal member 40 and which will be later described in conjunction with FIGS. 2-4. The pellet dispenser is shown in connection with a well casing 11 having a cap 12 which will receive a discharge tube 20 from the pellet dispenser 10. The pellet dispenser 10 is supported on a support pole 13 having the support flanges 15 which will receive the complementary flanges 14 from the pellet dispenser. A hopper 16 which will contain the pellets to be dispensed into the well casing 11 will include an angled wall 17 from which extends a rotor assembly or pellet discharge means 18 a portion of which is protected by a cover 19.

Referring specifically to FIGS. 2, 3 and 4, it will be seen that the rotor assembly 18 serves as a pellet discharge means and is positioned on the hopper 16 and specifically on the angled wall 17 having a passage 24 therethrough. An annular portion 25 of the rotor assembly 18 is interconnected with connecting portion 26 and extends through the annular passage 24 which is in communication with the inside of the hopper 16. The connecting portion 26 includes a base plate 48 and the flange section 27 with a slot 29 to receive a portion of the cover 19 and retain it thereon. A rotor member 30 is rotatably mounted inside the annular portion 25 of the rotor assembly 18 and includes the bearing housing sections 31 and 32 with the bearings 33 therebetween. A shaft section 34 extends from the bearing housing 31 and into a passage 35 of the bearing housing 32 for rotatable movement therein. Rotative retention of the bearing or rotor housing 31 of the rotor member 30 against the bearing housing section 32 is accomplished in part by means of a square sectioned extended portion 37 seated in a compartment 36 in shaft section 34 with the extended portion 37 being formed as portion of the drive gear 38. A screw 39 extends centrally through the drive gear 38 to hold a seal 40 between the gear 38 and the outer wall surface 56 of the bearing housing 32 to thereby also serve as a retention means for rotor housing 31 as well as a seal for the shaft section 34.

A drive motor 41 is suitably mounted on a post 42 and has a mounting ear 43 for engagement with a screw 44. Extending through the rotor 30 and particularly housing 31 is a passage 45 which will include a floor section 46 the function of which is explained in previously referred to co-pending patent application entitled "Bactericidal Pellet Dispenser." A tube portion 47 will communicate with the rotor passage 45 as well as with an additional passage portion 79 extending through the bearing or the rotor housing section 32. The discharge tube 20 is connected to the tube portion 47 by a standard screw type hose clamp 76. It will be noted that the rotor member 30 is secured in a biased manner to the hopper 16. This is accomplished by the bolts 50 passing through the angled wall 17 and the base plate 48 with the springs such as 98 being retained on the bolts 50 by the nuts 51 and the washers 97.

Referring specifically to FIG. 3, the seal member 40 is shown. It is fabricated from a fluorocarbon resin (Teflon) which is supplied in the form of a flat sheet having a thickness of 0.025 inch. An aperture 57 will be cut therein and the material cut in a circular manner. It will then be cold formed in a die to result in a hollow frusto conical shape with a large diameter portion 53 and a small diameter portion 54.

FIG. 4 illustrates the arrangement of the seal member 40 between the drive gear 38 and the bearing housing 32. It will be seen that the gear 38 has an annularly extended flange 21 for engagement with the seal member 40 and that a spacing 58 is afforded between the seal member 40 and the shaft section 34 as well as the bearing housing 32. The purpose of this spacing will be explained later in conjunction with the Operation. The drive gear 38 also has an angled wall surface 23 as well as a flat walled surface 55 to accommodate the conical shape of the seal 40. An angled wall surface 22 is provided on the shaft section 34 for a similar purpose. When the seal device is mounted as indicated in FIG. 4 it will be securely held by the gear 38 and will move with the gear 38 and the shaft section 34 when it is rotated and will slide over the wall or support surface 56. As the seal 40 is placed over the passage 35 for the shaft 34, it will provide an enclosure of the surrounding area thus forming a barrier between the outside of the bearing housing 32 and the inside thereof. It will be seen that the inside of the bearing housing is in communication with the inside of the hopper 16 through the bearing race 49 between the bearing housings 31 and 32 as well as the displacement between the pellet carrying passage 45 with the floor 46. Not only does the seal unit 40 serve as a seal between the bearing housing 32 and the outside atmosphere and a bearing surface as well, it also serves as a retention means for holding the bearing housing 31 against the bearing housing 32. This is accomplished by fabricating the seal member 40 from the fluorocarbon material which will have sufficient resiliency to accomplish a biasing effect on the gear 38 through its connection with the bearing housing 31 and its placement between the bearing housing 32 and the gear 38.

OPERATION

A better understanding of the advantages of the seal member 40 will be had in conjunction with the pellet dispenser 10 and a description of its operation. One method of utilizing dispensing apparatus 10 is indicated in FIG. 1 where it will be supported on a support pole 13 and in conjunction with a well casing 11 for the purpose of dispensing pellets in the form of tablets, such as chlorine tablets, into the well by way of the well casing 11. Accordingly, the hopper 16 will be filled to a desired level with suitable chlorine tablets. A complete description of the operation of the pellet dispenser itself will be had by reference to the previously referred to patent application for the Bactericidal Pellet Dispenser. It should be kept in mind that the chlorine pellets emit a chlorine gas which will tend to be discharged from the hopper 16. Although a suitable cover 99 is placed thereon, the gas can still travel outwardly therefrom between the bearing housings 31 and 32 of the rotor member 30 and between the shaft 34 and the bearing housing 32 as previously explained. This route of travel will be blocked as the seal member 40 will cover that portion of the shaft 34 extending from the shaft passage 35. As the seal member is cold formed, it will spring outwardly when it is placed between the gear 38 and the bearing housing support surface 56. This tensioning with the spacing 58 from the shaft 34 and a portion of the housing 32 makes the seal member more tolerant of the presence of debris as the outward spring effect and the spacing 58 will afford sufficient resiliency and displacement.

Other important aspects of the seal member 40 of this invention is the fact that it not only seals the drive mechanism for the rotor member 30 from the hopper 16 contents but it also acts as a lubricated bearing surface in its contact with the support surface 56. Additionally, it acts as a biasing and spacing means for the gear 38 in connection with the bearing housings 31 and 32 and the attachment screw 39. The fact that the seal unit 40 is composed of a fluorocarbon resin is important as it acts as a lubricating surface at the point of contact with support surface 56 when gear 38 is rotated. Other important features of the seal member 40 is the fact that as it wears it will constantly adapt itself to the support surface 56 as it is biased thereagainst. Further, it can be accommodated between very loose parts and it is not necessary to have accurate centering. Yet it will afford the desired sealing and spacing of the gear 38 features. Accordingly, zero tolerances are effected between the seal 40 and the contacted parts.

The seal member of this invention has been described as being composed of a fluorocarbon resin. Any type of material could be employed which will serve as a lubricated bearing surface as well as a biasing means for a gear driven rotor having a bearing assembly. For example, laminated fluoroplastics and fluorosilicicones could be employed. Neither is the particular frusto conical shape critical. Any geometric form which will afford the indicated biasing and spacing of the gear as well as the sealing feature could be utilized. To assist in contact with the gear 40 and the wall surface 56 the edges of the seal member 40 could be feathered. While the seal member has been described in conjunction with a rotary pellet dispensing apparatus, it could be employed in any gear driven apparatus where it is necessary to seal the gear shaft from the outside atmosphere and still afford a lubricated bearing surface as well as spacing means for the gear. Further, and if desired, the seal member 40 is adapted to curing minor discrepancies in wall dimensions during manufacture as the end portions such as 54 or 53 could be notched to relieve such problems.

It will thus be seen that through the present invention there is now provided a seal member for a pellet dispenser mechanism which can serve multiple functions. It not only acts as a seal against the emission of toxic fumes but also serves as a bearing and spacing or biasing means. It will accommodate loosely fitted parts yet will adapt to wearing conditions. The seal member of this invention is easily manufactured from readily available materials and can be formed from standard tooling. Accordingly, the seal member of this invention can be economically manufactured and utilized.

The foregoing invention can now be practiced by those skilled in the art. Such skilled persons will know that the invention is not necessarily restricted to the particular embodiments presented herein but the scope of the invention is to be defined by the terms of the following claims as given meaning by the preceding description.

We claim:

1. A seal member for a rotor assembly comprising:
   a rotor member including passages for the movement of particulate material therethrough;
   a housing providing a supporting surface;
   a shaft member connected to said rotor member and extending from said housing;
   a gear secured to said shaft member; and
   a seal member operatively positioned between said gear and said housing, said seal member encompassing the area of said shaft extension from said housing, said seal member constructed in a manner and of a material to provide both an enclosure of said area and a biasing of said gear away from said housing;
   wherein said gear and said shaft have angled surfaces to mate with respective inner and outer portions of said seal member with said seal member biased therebetween.

2. In a dispensing device for pellets having a rotor with at least one pellet carrying passage, said rotor adapted to be connected to a hopper with said pellet carrying passage in communication with an opening in the hopper, a housing for rotatably supporting said rotor, a shaft connected to said rotor and extending through said housing and a gear secured to said shaft, the improvement comprising: a seal member operatively positioned between said gear and said housing, said seal member surrounding the area of said shaft extension from said housing, said seal member constructed in a manner and of a material to provide both an enclosure of said area and a biasing of said gear away from said housing, wherein said gear includes an annular projection positioned to contact said seal member and wherein said gear and shaft have angled surfaces to mate with respective inner and outer portions of said seal member with said seal member biased therebetween.

* * * * *